United States Patent
Roth et al.

(10) Patent No.: US 6,776,645 B2
(45) Date of Patent: Aug. 17, 2004

(54) LATCH AND RELEASE SYSTEM FOR A CONNECTOR

(75) Inventors: Richard F. Roth, Brookline, NH (US); Richard P. Saulnier, Londonderry, NH (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 10/326,480

(22) Filed: Dec. 20, 2002

(65) Prior Publication Data

US 2004/0121643 A1 Jun. 24, 2004

(51) Int. Cl.[7] .............................................. H01R 13/627
(52) U.S. Cl. ....................................... 439/352; 439/159
(58) Field of Search ................................ 439/352, 159, 439/489; 385/60

(56) References Cited

U.S. PATENT DOCUMENTS

| | | | | |
|---|---|---|---|---|
| 6,102,726 A | * | 8/2000 | Tsuji et al. ................... | 439/352 |
| 6,224,414 B1 | * | 5/2001 | Fukuda ........................ | 439/352 |
| 6,280,225 B1 | * | 8/2001 | Nishide et al. .............. | 439/352 |
| 6,341,974 B1 | * | 1/2002 | Konoya ....................... | 439/489 |
| 6,358,081 B1 | * | 3/2002 | Saka et al. ................... | 439/489 |
| 6,386,898 B1 | * | 5/2002 | Taguchi ....................... | 439/352 |
| 6,454,463 B1 | * | 9/2002 | Halbach et al. ............... | 385/60 |
| 6,494,732 B2 | * | 12/2002 | Kashiyama et al. ......... | 439/352 |
| 6,524,125 B2 | * | 2/2003 | Nakamura .................... | 439/352 |
| 6,530,800 B2 | * | 3/2003 | Nakamura .................... | 439/352 |

* cited by examiner

*Primary Examiner*—Gary Paumen
(74) *Attorney, Agent, or Firm*—David H. Hwang; Teradyne Legal Dept.

(57) ABSTRACT

A latch and release system for a connector disposable within a mating receptacle is provided, where the connector includes a body having a latch portion and a movable release portion, with the movable release portion having a biasing member. The latch and release system also includes an engaging member attached to the mating receptacle, with the engaging member having an engaging portion to engage the latch portion of the connector body when the connector is disposed in the mating receptacle. An abutment portion of the mating receptacle abuts the movable release portion of the connector body when the connector is disposed in the mating receptacle to cause the biasing member of the movable release portion to be biased. The latch and release system further includes a release member having an actuatable portion, where the actuatable portion is actuatable by a user to cause the engaging portion of the engaging member to disengage from the latch portion of the connector body and to cause the biasing member of the movable release portion to become unbiased, whereby this unbiasing of the biasing member creates a force to automatically eject the connector from the mating receptacle.

22 Claims, 8 Drawing Sheets

LATCH AND RELEASE SYSTEM FOR A CONNECTOR

BACKGROUND OF THE INVENTION

The present invention relates to a latch and release system for a connector disposable within a mating receptacle.

Electrical connectors and fiber optic connectors for high speed computing and communications systems are known. For example, a backplane assembly designed for light transmission generally includes fiber optic connectors attached to the backplane. The connectors typically house a ferrule that holds a single-fiber or a multi-fiber optical ribbon. A backplane is basically a printed circuit board ("PCB"). The backplane fiber optic connectors are typically housed within a mating receptacle, which is often referred to as an "adapter". The mating ferrule, typically disposed within a corresponding connector on a daughter card (which is a PCB connected to the backplane), is joined to the backplane connector ferrule within the mating receptacle. In this manner, optical signals can be passed between the backplane and the daughter card.

As connectors shrink in size to meet the growing demand for smaller and denser devices, their latching mechanisms and other components must be reduced in size accordingly. However, this miniaturization of components creates an increasing challenge to design a connector that is both reliable and easy to use.

One of the problems that has resulted from this miniaturization trend is the difficulty in designing a connector that is both easy to insert and remove from the mating receptacle. Removal of a connector from the mating receptacle is common. It is necessary for both maintenance and repair. Inventors of the present invention have identified that many of the existing latch and release systems for connectors often suffer from one or more of the following disadvantages.

As the size of the connectors and the space between the connectors in a mating receptacle decrease, it becomes more difficult to release the proper connector without disengaging or disrupting the neighboring connectors. Also, because an installer's fingers are usually much larger than the latch/release mechanism, this tends to increase the likelihood of damage to the connector or its neighboring connectors due to mishandling. Mishandling can result from a number of different reasons. For example, frustration, improper use of tools and/or lack of proper tools for use within a confined space. Further, latch and release systems are typically designed for a specific application and cannot readily be used with different connector platforms. Often, latch mechanisms are built directly into the connector. And existing latch and release systems often can snag and be susceptible to damage.

What is desired, therefore, is a latch and release system for a connector disposable within a mating receptacle that addresses the above mentioned disadvantages of the existing solutions.

SUMMARY OF THE INVENTION

The objects of the present invention are achieved in one embodiment by a latch and release system for a connector disposable within a mating receptacle, where the connector includes a body having a latch portion and a movable release portion, with the movable release portion having a biasing member. The latch and release system also includes an engaging member attached to the mating receptacle, with the engaging member having an engaging portion to engage the latch portion of the connector body when the connector is disposed in the mating receptacle. An abutment portion of the mating receptacle abuts the movable release portion of the connector body when the connector is disposed in the mating receptacle to cause the biasing member of the movable release portion to be biased. The latch and release system further includes a release member having an actuatable portion, where the actuatable portion is actuatable by a user to cause the engaging portion of the engaging member to disengage from the latch portion of the connector body and to cause the biasing member of the movable release portion to become unbiased, whereby this unbiasing of the biasing member creates a force to automatically eject the connector from the mating receptacle.

DETAILED DESCRIPTION OF THE PREFERRED EMBODIMENT

Figure 1:
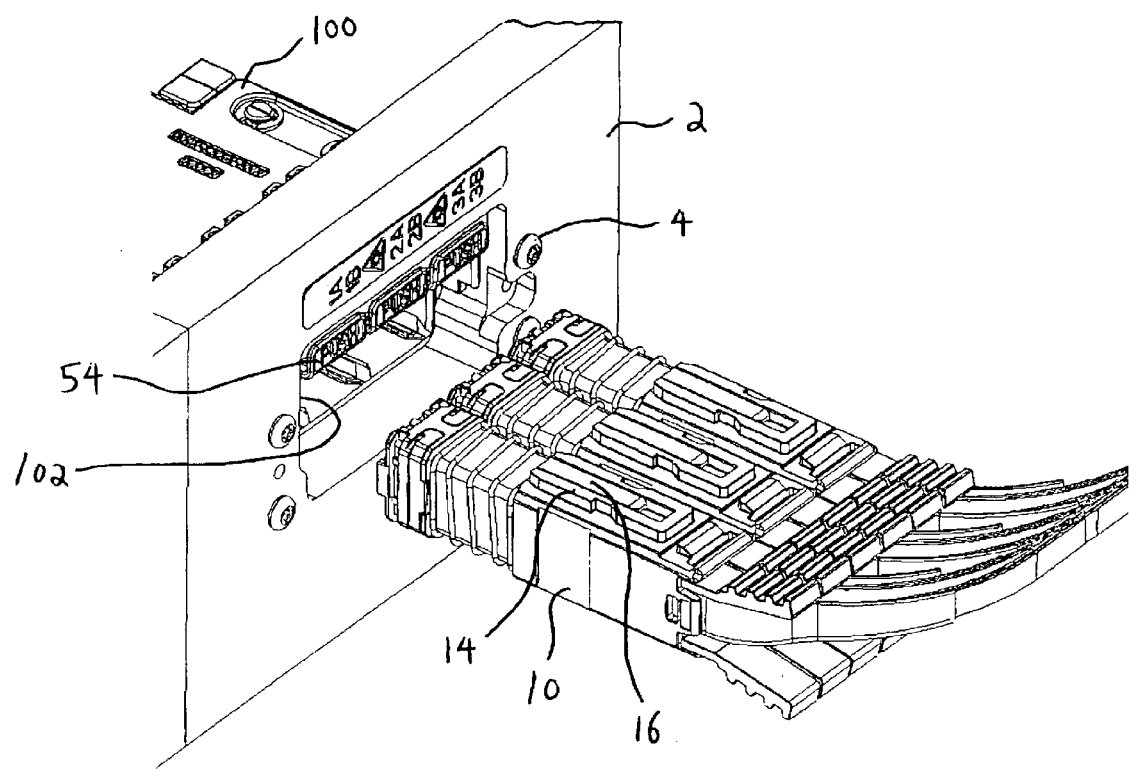
FIG. 1 is a perspective view of connectors disposable within a mating receptacle attached to a printed circuit board, in accordance with an embodiment of the present invention.

FIG. 1 is a perspective view of connectors disposable within a mating receptacle attached to a printed circuit board, in accordance with an embodiment of the present invention. Each of the connectors 10 are identical in this embodiment, although they need not be. The connectors 10 are disposable within the mating receptacle 100 through an opening 102 in the mating receptacle 100 and the printed circuit board 2. The printed circuit board 2 in FIG. 1 is shown for illustration purposes as a backplane. The mating receptacle 100 is attached to the printed circuit board 2 by screws 4. However, as known, other attachment means may be utilized to attach the mating receptacle 100 to the printed circuit board 2.

Figure 2:
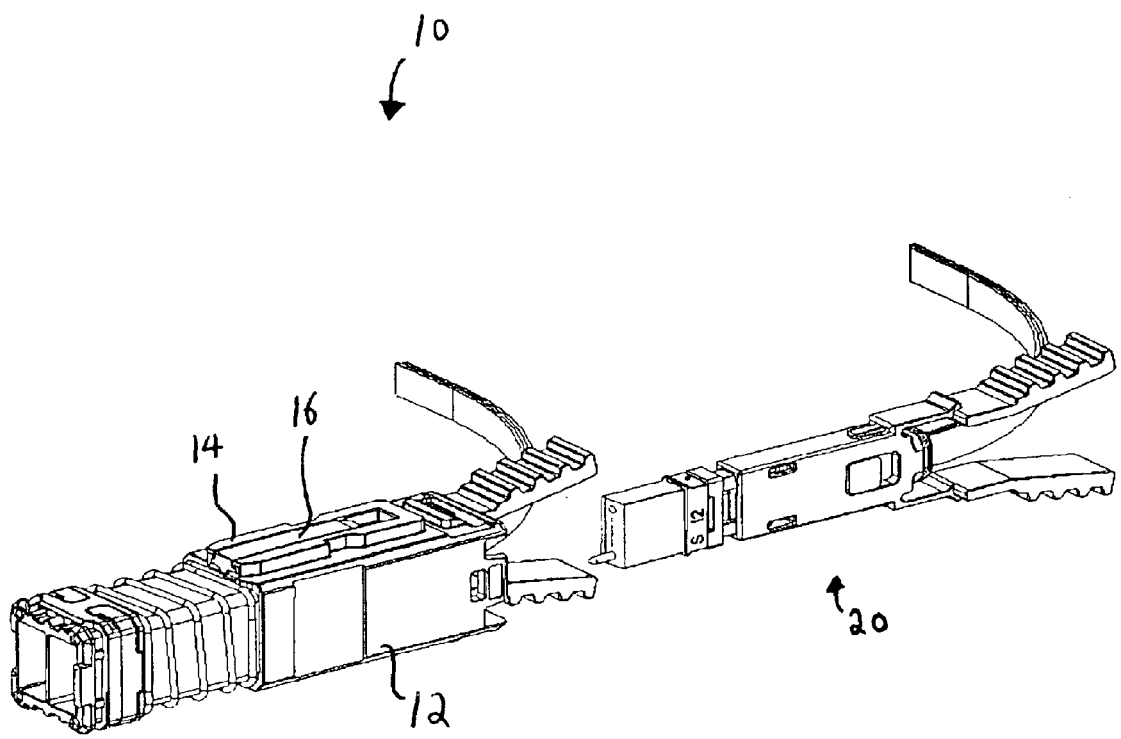
FIG. 2 is a perspective view of one of the connectors of FIG. 1, showing a ferrule assembly disposable therein.

FIG. 2 is a perspective view of one of the connectors 10 of FIG. 1. The connector 10 includes a body 12 having a latch portion 14 and a movable release portion 16. Although not visible, the movable release portion 16 includes a biasing member, such as a coiled spring, for purposes to be described herebelow. The connector 10 also includes two ferrule assemblies, with each ferrule assembly designated by reference numeral 20. This configuration of a connector having two ferrule assemblies is referred to as a "duplex"

configuration. The ferrule assembly 20 is described and claimed in a patent application, assigned to the assignee of the present application, entitled "Ferrule Assembly And Methods Therefor" and is filed concurrently herewith. This application is incorporated by reference herein.

As shown in the drawings of the embodiment, the connector 10 is an optical connector. However, as will become more apparent to one of ordinary skill in the art, the latch and release system of the present invention is applicable to any connector and mating receptacle type of configuration.

Figure 3:
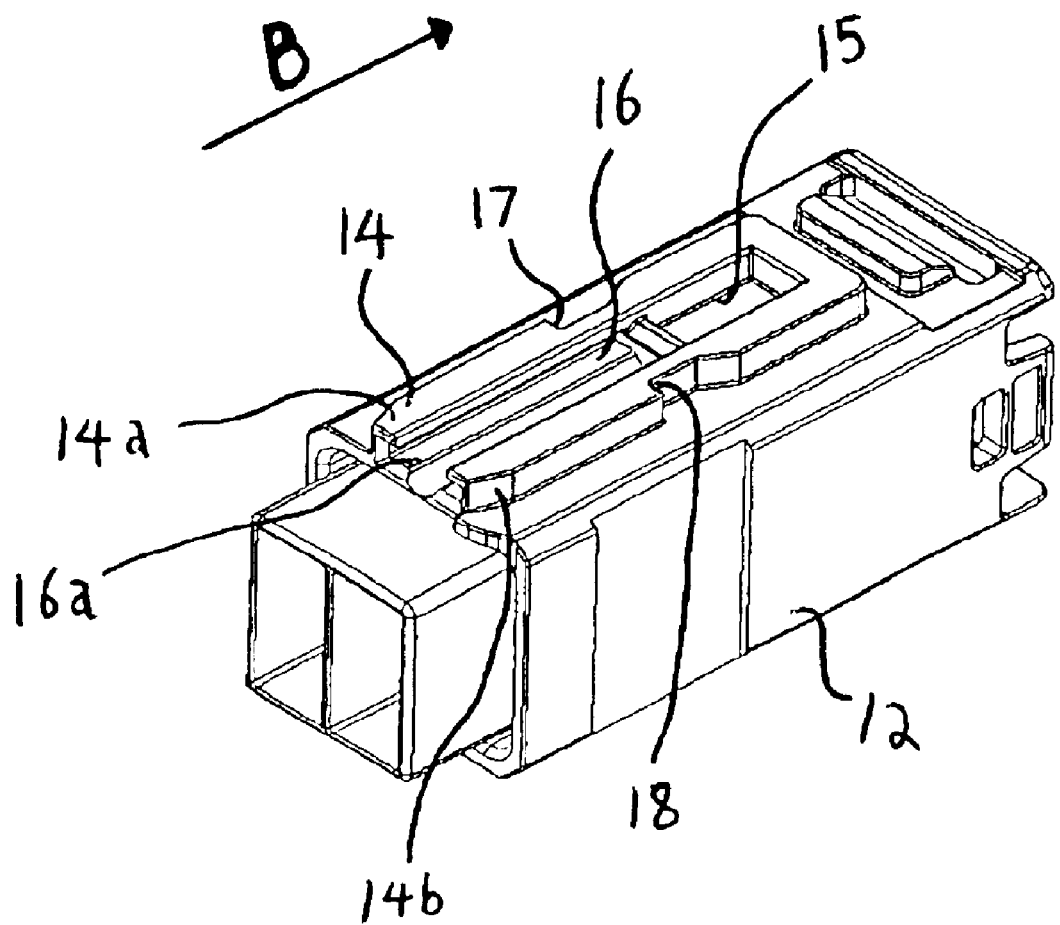
FIG. 3 is a perspective view of a body of the connector of FIG. 2, showing a latch portion and a movable release portion.

FIG. 3 is a perspective view of the body 12 of the connector 10 of FIG. 2. Preferably, the latch portion 14 is integrally formed with the connector body 12. The connector body 12 may be formed from a material such as metal or plastic. Also, in the preferred embodiment, the latch portion 14 is generally U-shaped to define a channel 15 in which the movable release portion 16 is slidably disposed. Arrow B indicates the direction of bias of the biasing member of the movable release portion 16. If the biasing member is a coiled spring, then arrow B would indicate the direction of compression of the coiled spring. The latch portion 14 further includes first and second notches 17, 18 that will be utilized to engage the mating receptacle 100.

Figure 4:
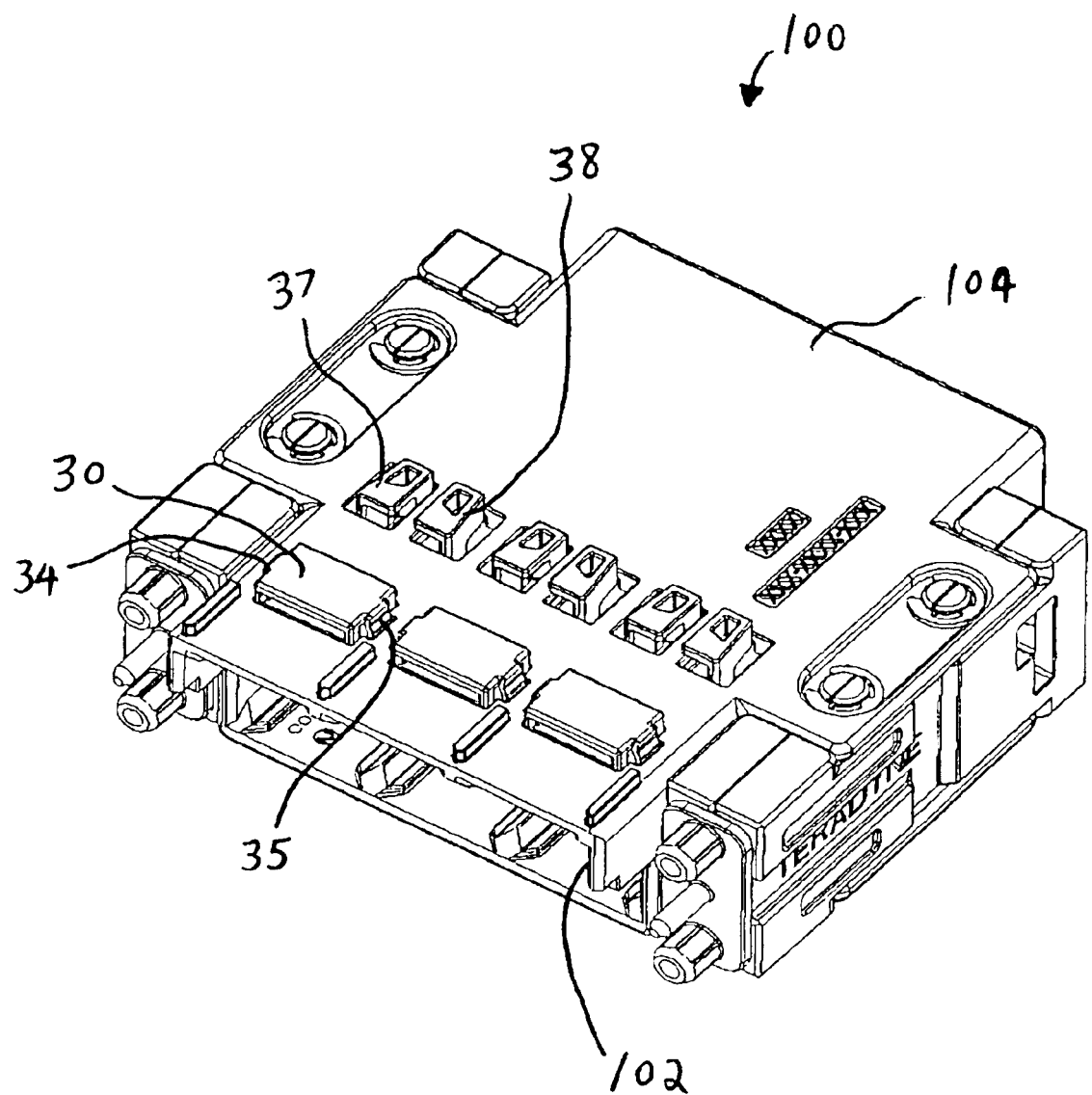
FIG. 4 is a perspective view of the assembled mating receptacle assembly of FIG. 1.
Figure 5:
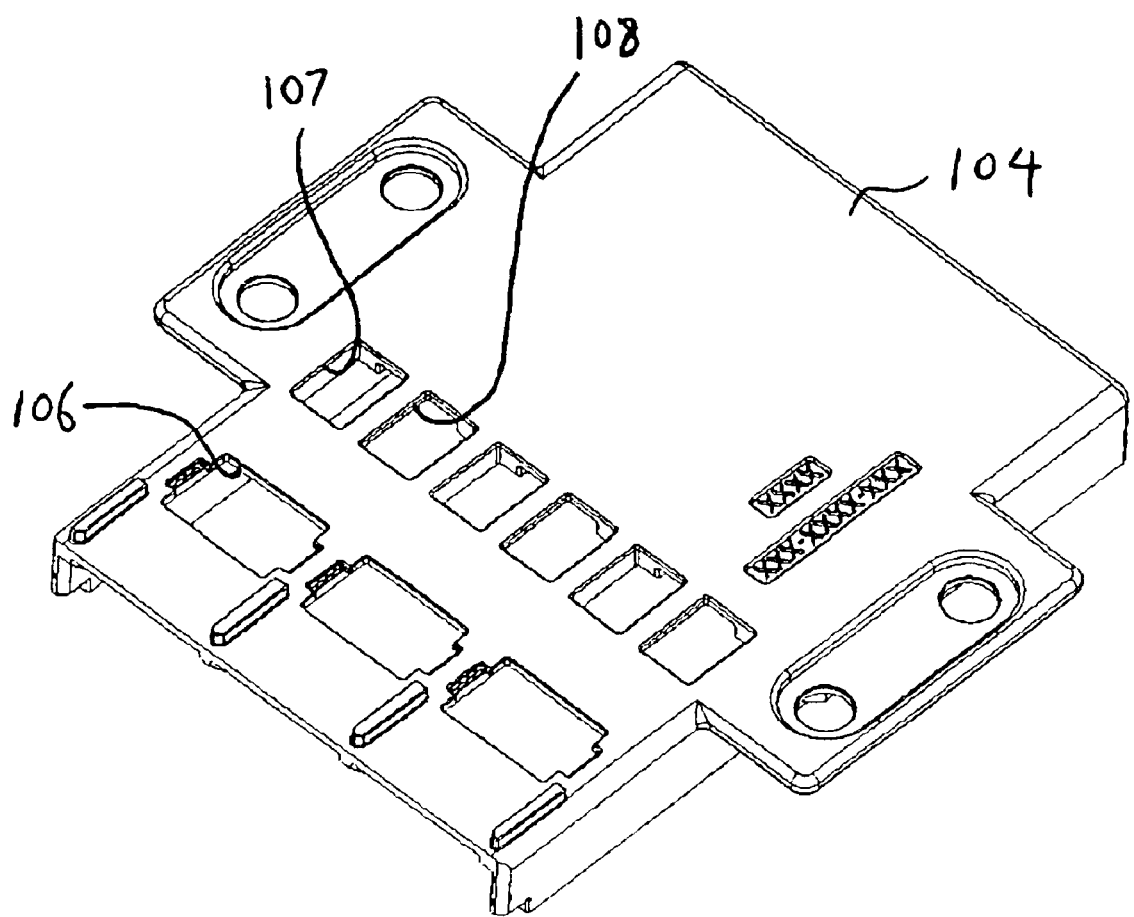
FIG. 5 is a perspective view of a portion of the mating receptacle of FIG. 4.
Figure 6:
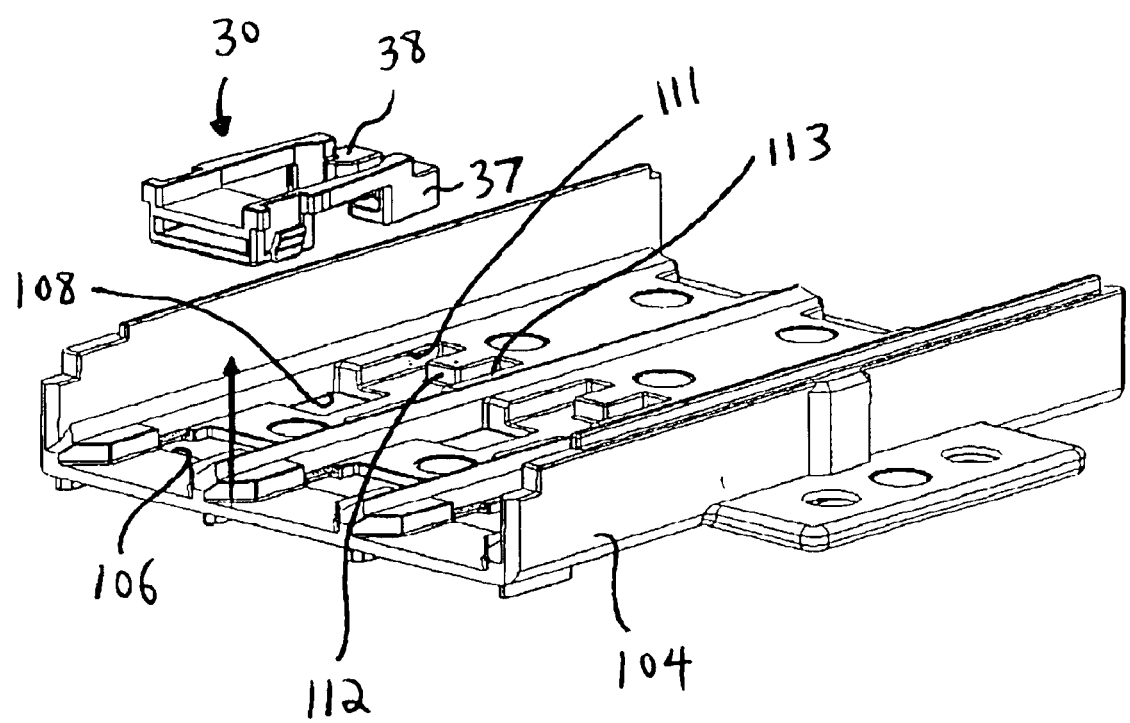
FIG. 6 is an upside-down perspective of the portion of the mating receptacle of FIG. 5, showing an engaging member attachable thereto.
Figure 7:
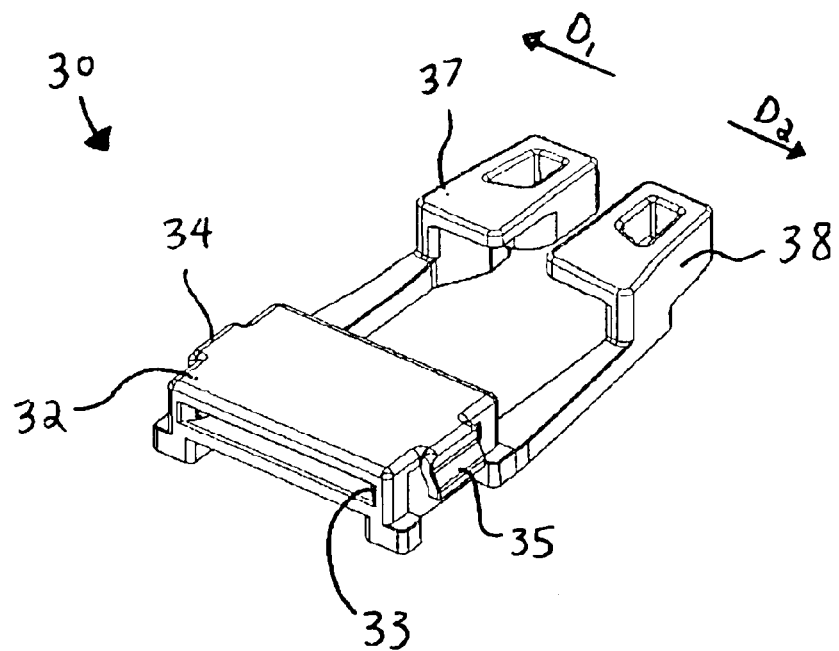
FIG. 7 is a perspective view of the engaging member of FIG. 6.

FIGS. 4–6 show different perspective views of the mating receptacle 100. FIG. 4 is a perspective view of the assembled mating receptacle assembly 100. FIG. 5 is a perspective view of a portion or one housing surface 104 of the mating receptacle assembly 100 of FIG. 4. FIG. 6 is an upside-down perspective of the housing surface 104 of the mating receptacle assembly 100 of FIG. 5, showing an engaging member 30 attachable thereto. The engaging member 30 is shown in greater detail in FIG. 7.

Figure 8:
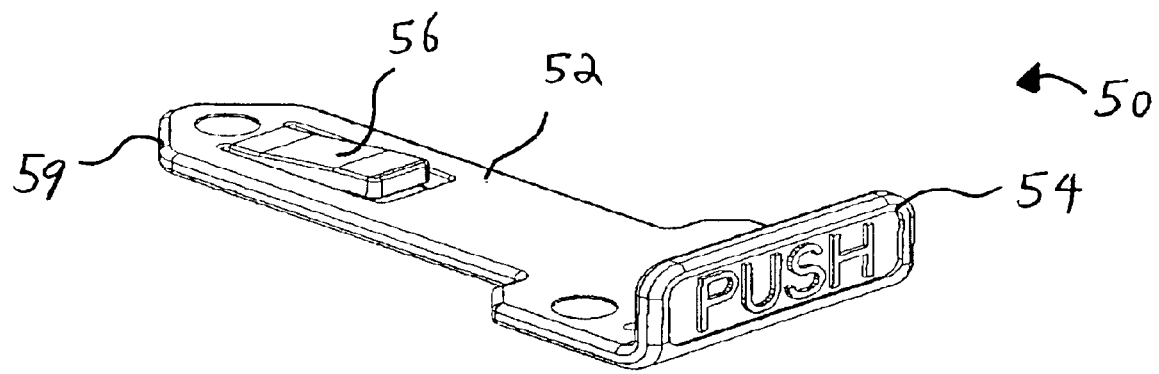
FIG. 8 is a perspective view of a release member of FIG. 1.

The engaging member 30 includes first and second arms 37, 38 that are configured to engage the first and second notches 17, 18 of the latch portion 14 of the connector body 12 (see FIG. 3). While the preferred embodiment utilizes two arms 37, 38 engaging two notches 17, 18, it should be apparent to one of ordinary skill in the art that a different number of arm(s) and notch(es) or a different engaging mechanism may be employed without departing from the scope of this invention. The engaging member 30 also includes a body 32 which defines an aperture 33. This aperture or slot 33 is sized to receive an actuatable portion 52 of a release member 50 (FIG. 8). The body 32 of the engaging member 30 further includes first and second protrusions 34, 35 for engaging the mating receptacle 100. Preferably, the engaging member is made from plastic. However, metal (such as sheet metal) may also be used in some cases.

Returning to FIGS. 4–6, and to FIG. 5 in particular, the housing surface 104 of the mating receptacle 100 defines openings 106, 107, 108 for each engaging member 30 to be attached thereto. Opening 106 receives the body 32 of the engaging member 30 and openings 107, 108 receive the arms 37, 38 of the engaging member 30. The first and second protrusions 34, 35 of the body 32 engage an area of the housing surface 104 around the opening 106 so that the engaging member 30 is securely attached to the mating receptacle 100. This is shown in FIG. 4. Note that while the preferred embodiment shows the engaging member 30 being removably attachable to the mating receptacle 100, the engaging member may be fixedly attached to the mating receptacle 100. The mating receptacle 100 is exemplarily assembled by means of holes and bolts or screws (not referenced) in the drawings. However, any other means for attaching the mating receptacle assembly 100 may be employed.

Referring now to FIG. 6, the interior side of the housing surface 104 includes first and second grooves 111, 113 having an abutment portion 112 therebetween. When the connector 10 is disposed in the mating receptacle 100, ends 14a, 14b of the U-shaped latch portion 14 of the connector body 12 (see FIG. 3) is disposed in the grooves 111, 113. At the same time, end 16a of the movable release portion 16 abuts the abutment portion 112 to cause the movable release portion 16 to move in the direction of arrow B (see FIG. 3), thereby causing the biasing member of the movable release portion 16 to become biased. This bias force of the biasing member causes the arms 37, 38 of the engaging member 30 to be firmly engaged to the notches 17, 18 of the latch portion 14 of the connector body 12.

FIG. 8 shows the release member 50 having the actuatable portion 52 that is received in the aperture or slot 33 in the body 32 of the engaging member 30. The release member 50 also includes an enlarged button portion 54 and a stop 56 that prevents the actuatable portion 52 from accidentally withdrawing from the slot 33 of the engaging member 30. In the preferred embodiment, the stop 56 is a tongue protruding from a surface of the actuatable portion 52.

Figure 9:
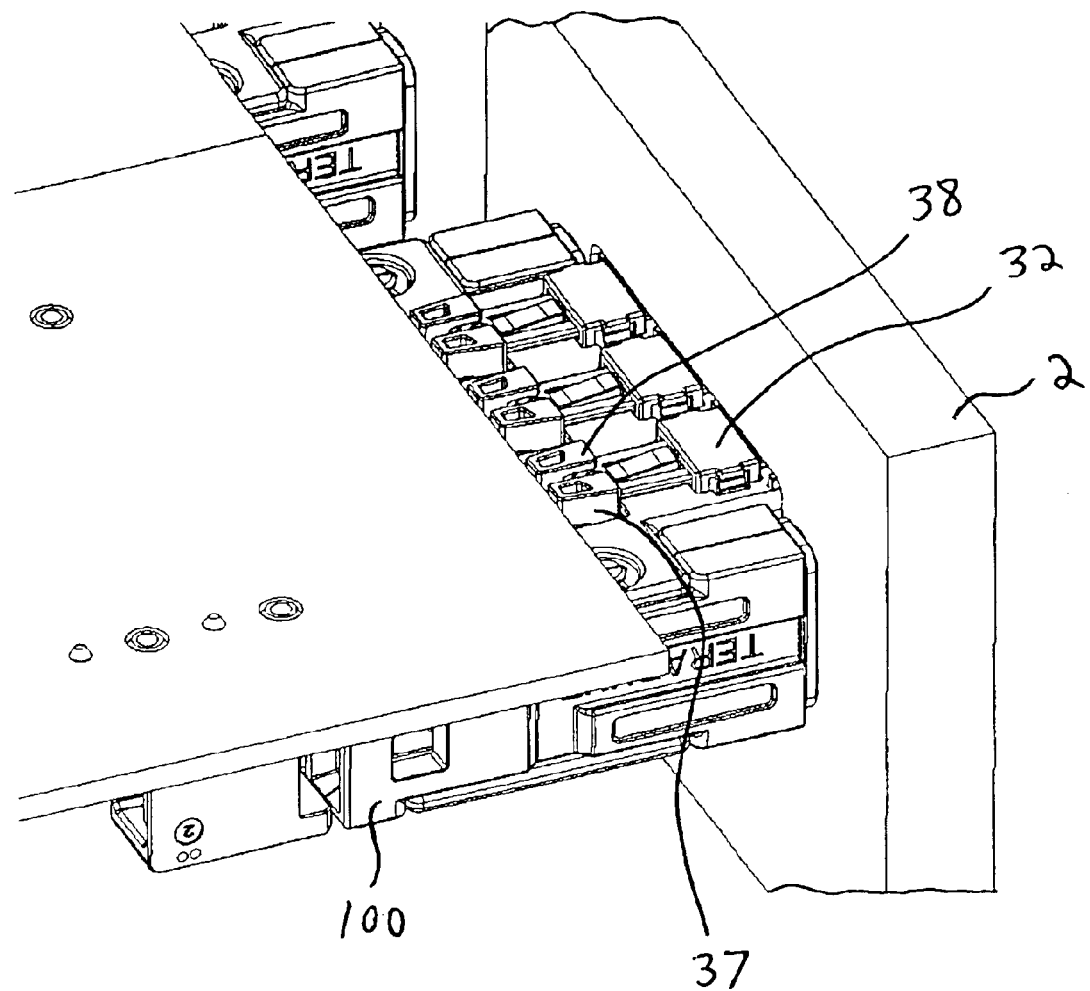
FIG. 9 is a partial perspective view of the mating receptacle attached to the printed circuit board of FIG. 1, the mating receptacle showing the engaging member of FIG. 7.

Operation of the release member 50 is described in conjunction with FIGS. 1 and 9. As shown in FIG. 1, after the connectors 10 are disposed in the mating receptacle 100, only the enlarged button portion 54 of the release member 50 is exposed to a user. This decreases the likelihood of snagging or other potential for damage. Further, space requirements are minimized because this design does not require a large footprint to accommodate a latch/release mechanism. When the user pushes the enlarged button portion 54, this causes the actuatable portion 52 of the release member 50 to push against the first and second arms 37, 38 of the engaging member 30. A curved end configuration 59 of the actuatable portion 52 (see FIG. 8) results in the first arm 37 being displaced in the direction of arrow $D_1$ (see FIG. 7) and the second arm 38 being displaced in the direction of arrow $D_2$. This displacement of the first and second arms 37, 38 causes the arms 37, 38 to be disengaged from the notches 17, 18 of the latch portion 14 of the connector body 12. And because the connector 10 is no longer attached to the engaging member 30, the biasing member in the movable release portion 16 of the connector body 12 becomes unbiased, causing the movable release portion 16 to move in the direction opposite arrow B of FIG. 3. This action of the biasing member forces the movable release portion 16 to "push" against the abutment portion 112 of the mating receptacle (see FIG. 6), thereby resulting in the automatic ejection of the connector 10 from the mating receptacle 100.

While the preferred embodiment utilizes a release member that operates by pushing, it would be apparent to one of ordinary skill in the art that the latch and release system described herein may be modified so that the release member may operate by pulling or some other means. Having thus described the preferred embodiment of the present invention with sufficient particularity to enable those skilled in the art to make and use the invention, and having described variations and modifications of the preferred embodiment, it should nevertheless be appreciated that still further variations and modifications of the invention are possible, and that all such variations and modifications should be considered within the scope of the invention.

What is claimed is:

1. A latch and release system for a connector disposable within a mating receptacle, which comprises: the connector including a body having a latch portion and a movable release portion, the movable release portion having a biasing member;

an engaging member attached to the mating receptacle, the engaging member having an engaging portion to engage the latch portion of the connector body when the connector is disposed in the mating receptacle;

an abutment portion of the mating receptacle, the abutment portion abutting the movable release portion of the connector body when the connector is disposed in the mating receptacle to cause the biasing member of the movable release portion to be biased; and a release member having an actuatable portion, the actuatable portion being actuatable by a user to cause the engaging portion of the engaging member to disengage from the latch portion of the connector body and to cause the biasing member of the movable release portion to become unbiased, whereby this unbiasing of the biasing member creates a force to automatically eject the connector from the mating receptacle.

2. The latch and release system of claim 1, wherein the latch portion is integrally formed with the connector body.

3. The latch and release system of claim 1, wherein the latch portion of the connector body includes first and second notches and the engaging portion of the engaging member comprises first and second arms configured to engage the first and second notches.

4. The latch and release system of claim 1, wherein the movable release portion is slidably disposed in a channel defined by the latch portion of the connector body.

5. The latch and release system of claim 1, wherein the movable release portion is positioned relative to the latch portion such that when the connector is disposed in the mating receptacle to cause the biasing member of the movable release portion to be biased, the bias force of the biasing member allows the engaging portion of the engaging member to be firmly engaged to the latch portion of the connector body.

6. The latch and release system of claim 1, wherein the engaging member is removably attached to the mating receptacle, the engaging member being received in an opening defined in the mating receptacle.

7. The latch and release system of claim 1, wherein the engaging member further comprises a body defining an aperture, the aperture being sized to receive the actuatable portion of the release member.

8. The latch and release system of claim 7, wherein the release member further comprises a stop to prevent the actuatable portion of the release member from accidentally withdrawing from the engaging member.

9. The latch and release system of claim 8, wherein the stop of the release member is a tongue protruding from a surface of the release member.

10. The latch and release system of claim 1, wherein the release member further comprises an enlarged button portion, wherein an application of force to the enlarged button portion causes the actuatable portion of the release member to disengage the engaging portion of the engaging member from the latch portion of the connector body.

11. The latch and release system of claim 10, wherein only the enlarged button portion of the release member is exposed to the user, thereby decreasing potential for damage to the latch and release system.

12. The latch and release system of claim 10, wherein the force applied to disengage the engaging portion of the engaging member from the latch portion of the connector body can be a pulling force or a pushing force.

13. A connector disposable within and releasably attachable to a mating receptacle, the connector and the mating receptacle comprising:

the connector including a body having a latch portion and a movable release portion, the movable release portion having a biasing member;

the mating receptacle including an engaging member, the engaging member having an engaging portion to engage the latch portion of the connector body when the connector is disposed in the mating receptacle;

the mating receptacle also including an abutment portion, the abutment portion abutting the movable release portion of the connector body when the connector is disposed in the mating receptacle to cause the biasing member of the movable release portion to be biased; and a release member operable on the engaging member, the release member having an actuatable portion and an enlarged button portion, wherein an application of force by a user to the enlarged button portion causes the actuatable portion to disengage the engaging portion of the engaging member from the latch portion of the connector body and the biasing member of the movable release portion to become unbiased, whereby this unbiasing of the biasing member causes the connector to be automatically ejected from the mating receptacle.

14. The connector and the mating receptacle of claim 13, wherein the latch portion is integrally formed with the connector body.

15. The connector and the mating receptacle of claim 13, wherein the latch portion of the connector body includes first and second notches and the engaging portion of the engaging member comprises first and second arms configured to engage the first and second notches.

16. The connector and the mating receptacle of claim 13, wherein the movable release portion is slidably disposed in a channel defined by the latch portion of the connector body.

17. The connector and the mating receptacle of claim 13, wherein the movable release portion is positioned relative to the latch portion such that when the connector is disposed in the mating receptacle to cause the biasing member of the movable release portion to be biased, the bias force of the biasing member allows the engaging portion of the engaging member to be firmly engaged to the latch portion of the connector body.

18. The connector and the mating receptacle of claim 13, wherein the engaging member is removably attached to the mating receptacle, the engaging member being received in an opening defined in the mating receptacle.

19. The connector and the mating receptacle of claim 13, wherein the engaging member further comprises a body defining an aperture, the aperture being sized to receive the actuatable portion of the release member.

20. The connector and the mating receptacle of claim 19, wherein the release member further comprises a stop to prevent the actuatable portion of the release member from accidentally withdrawing from the engaging member.

21. The connector and the mating receptacle of claim 13, wherein only the enlarged button portion of the release member is exposed to the user, thereby decreasing potential for damage to the connector and the mating receptacle.

22. The connector and the mating receptacle of claim 13, wherein the force applied to disengage the engaging portion of the engaging-member from the latch portion of the connector body can be a pulling force or a pushing force.

* * * * *